(No Model.)
J. MURRAY.
PENDULUM LEVEL.
No. 328,052.   Patented Oct. 13, 1885.
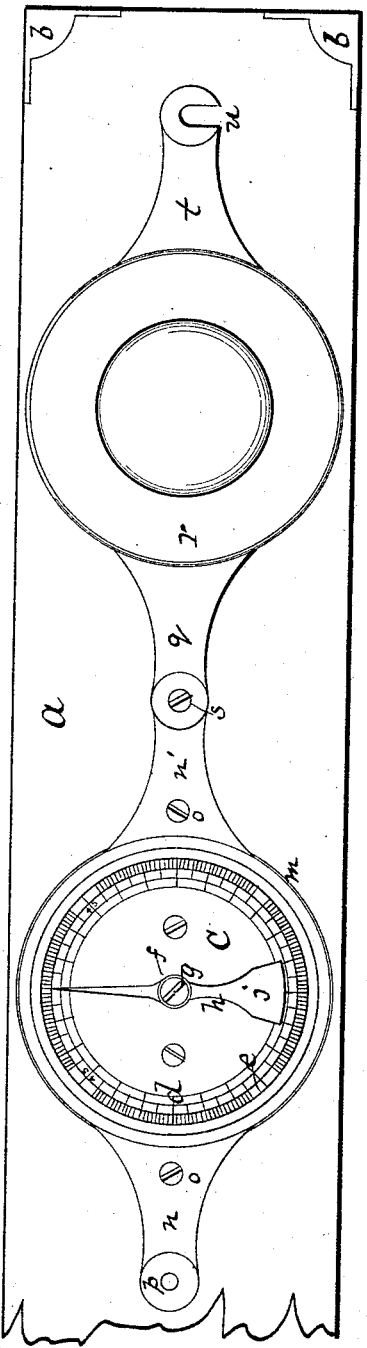
Fig. 1.
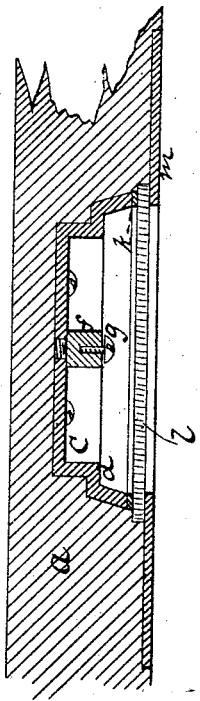
Fig. 2.
Fig. 3.
Witnesses:
R. R. Loury
J. H. Instman
Inventor:
John Murray
Per O. D. Levis
Attorney

UNITED STATES PATENT OFFICE.

JOHN MURRAY, OF PITTSBURG, PENNSYLVANIA.

PENDULUM-LEVEL.

SPECIFICATION forming part of Letters Patent No. 328,052, dated October 13, 1885.

Application filed June 30, 1884. Serial No. 136,487. (No model.)

*To all whom it may concern:*

Be it known that I, JOHN MURRAY, a subject of the Queen of Great Britain and a resident of Allegheny city, in the county of Allegheny and State of Pennsylvania, have made a new and useful Improvement in that class of leveling-instruments that are ordinarily combined with a rectangular wooden stock and used by masons, mill-wrights, carpenters, and other artisans to adjust their work and ascertain its line of direction from a perpendicular to that of a horizontal plane.

The invention I have made will be readily understood from the following description, taken in connection with the accompanying drawings, wherein—

Figure 1 represents a front or plan view of so much of my improved leveling-instrument as will exhibit its several operating parts; Fig. 2, a longitudinal transverse section of the same; Fig. 3, a detached view of the balanced index hand or pointer and pivoted screw therein.

To construct my improved level I prepare an oblong rectangular wooden stock, $a$, of suitable size, after the ordinary regulation pattern, and provide the same with brass corner-plates, $b$, to prevent abrasion. Midway from each end, and in one side of the stock, I embed a circular metallic cup, $c$, the internal diameter of which is suddenly enlarged at or near the middle of its depth to constitute a square shoulder or flat ledge, $d$, upon and entirely around the upper face of which is engraved or otherwise marked three scales of gradation having spaces at intervals denoted by numeral figures. The outer scale, $e$, will indicate by each degree an inclination of the stock one-quarter to the foot, the middle scale one-half to the foot, and the inner scale one to the foot, and when the pointer stands at figure "45" the inclination of the stock will be that of forty-five degrees to a horizontal plane. When the instrument is so placed as that its pointer will move about a line parallel with the length of the stock, the same may be used as a plummet.

Affixed exactly in the center of the cup $c$ is a small post, $f$, a little higher than the surrounding ledge $d$, and on top of this post is pivoted, by means of a suitable screw, $g$, a delicately-balanced index hand or pointer, $h$, that is free to move around on its pivot, but so weighted by a short piece of metal, $i$, soldered or otherwise made fast to its broadest and shortest end $j$, as to cause its thin and longest end to keep a vertical position or point to the zenith.

The manner of mounting the center $g$, upon which the index turns, is important. I employ the plug or post $f$ for inserting the screw $g$ into. This plug is removably secured in the base of the cup, and may be taken out to have its bearing for the screw $g$ recut, or to be discarded and a new one put in its place. It is a well-known fact that bearings for centers of this sort become worn and uneven. There is a strain occasioned by the weighted index which will wear off the even top surface of the plug at some points more than at others, will cause the screw to become loose in the plug, and will make it necessary to redress the plug or replace it by a new one in order to keep the instrument in good working condition. With the removable plug which I employ, and the center for the index finding a seat or bearing in said plug and not in the body of the beam $a$, nor in the bottom of the cup $c$, I am enabled to keep the parts in a smoothly and accurately working condition, thereby insuring exact and reliable indications on the scale by the index.

Around the top edge of the cup $c$ is a thick paper or other elastic gasket, $k$, upon which rests a suitable flat glass plate, $l$, that is securely held in place by means of a broad brass ring, $m$, the upper surface of which is on a level with that of the wooden stock $a$. This brass ring $m$ is provided with two arms, $n$ $n'$, that extend lengthwise of the wooden stock, and are secured therein each by means of an appropriate small screw, $o$. One of the arms is furnished at or near its extremity with a short stout projecting pin, $p$, and the remote portion of the other arm is pivoted to a correspondingly-shaped portion, $q$, of a flat brass plate, $r$, of such exterior dimensions as that, when turned around edgewise on its pivotal point $s$, it will completely cover the glass plate $l$ in such a manner as to exclude dust therefrom and prevent breakage. As the cover $r$ is also provided with an arm, $t$, answering in size and form that supporting the pin $p$, and which arm $t$ is so shaped as to constitute a hook, $u$, it is obvious that on turning the cover sufficiently far to close the glass the said hook will catch over the pin, and thus temporarily keep the cover in place.

This instrument, having been constructed after the manner shown and described, will be found of great practical utility in the hands of those requiring a means of accurately ascertaining the degrees of incline or slant in various kinds of mechanical or architectural work, and to that end it may be used either as a leveling-instrument or "plumb," to indicate any deviation from a vertical or horizontal plane.

Although the metallic cup $c$ may have its interior left plain and the scale marked or engraved directly upon the metal, I prefer to have its interior wholly enameled or coated with white porcelain, and the marks and figures of the scale of indelible black, or such color as will be most easily and plainly seen in a dark place.

Having thus described my combined level and plumb, I claim—

The herein-described level, consisting of the beam $a$ and cup $c$ set therein, having the scale or graduations described, a removable central plug or bearing-post, $f$, placed in the bottom of the cup, the center $g$, screwed into said plug, and the index $h\ i\ j$, swung upon said center, substantially as described, and for the purpose set forth.

JOHN MURRAY.

Witnesses:
R. S. LEVIS,
R. R. LOURY.